July 28, 1959     F. L. HENNEFER     2,896,234
ERASER CLEANER
Filed Oct. 19, 1956
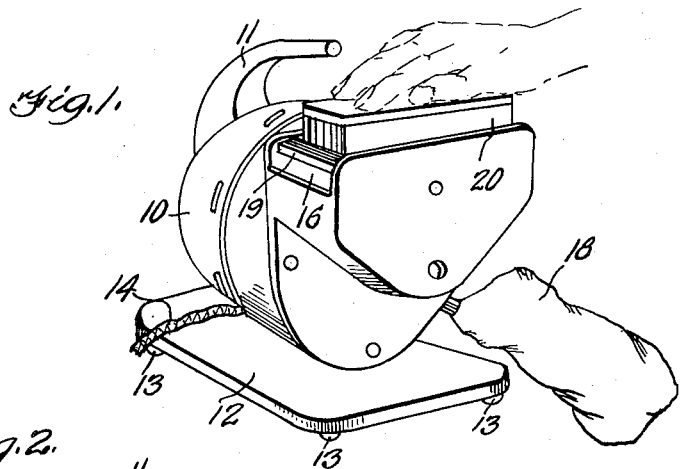
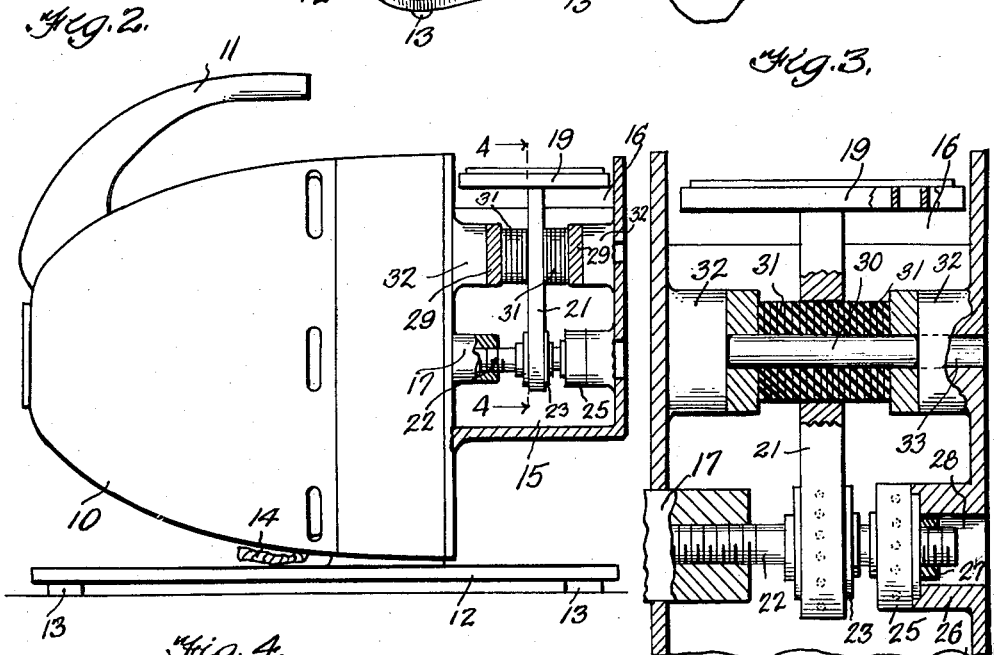
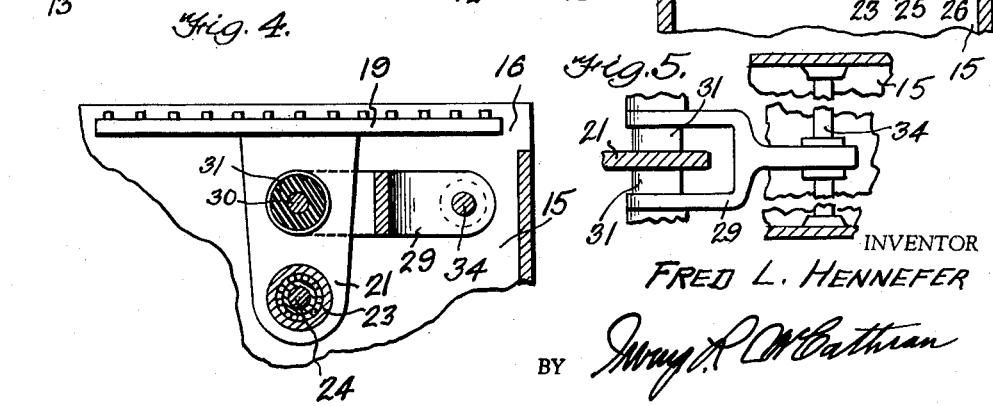
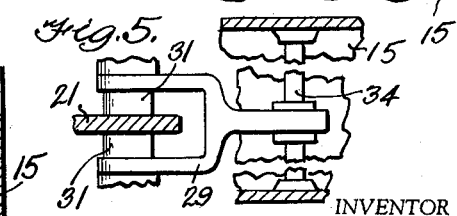
INVENTOR
FRED L. HENNEFER
BY *Irving R. McCathran*
HIS ATTORNEY

2,896,234
ERASER CLEANER

Fred L. Hennefer, Kaysville, Utah

Application October 19, 1956, Serial No. 617,118

2 Claims. (Cl. 15—89)

This invention relates to eraser cleaners, and more particularly to a machine especially designed for cleaning blackboard erasers, and has for one of its objects the production of a simple and efficient rubber or similar mount for connecting the cleaning element supporting arm with the rocker arm to take up the jar during operation and to thereby keep the connecting shaft between the cleaning element supporting arm and rocker arm from breaking.

Other objects and advantages of the present invention will appear throughout the following specification and claims.

In the drawing:

Figure 1 is a perspective view of the eraser cleaner;

Figure 2 is a side elevational view, the cleaning chamber being shown in vertical section;

Fig. 3 is an enlarged fregmentary vertical sectional view of the cleaning chamber and the structural features mounted therein;

Figure 4 is an enlarged fragmentary vertical sectional view taken on line 4—4 of Figure 2, certain parts being shown in elevation;

Figure 5 is a fragmentary horizontal sectional view through the cleaning chamber, looking downwardly upon the rocker arm and showing the cleaning element supporting arm in cross section.

By referring to the drawing in detail, it will be seen that 10 designates a motor casing of a conventional type having a handle 11 on the top thereof to facilitate moving the device from place to place. The motor casing 10 is supported upon a base plate 12 which is provided upon the under face thereof with rubber or cushion pads 13 for engagement with a suitable support. A suitable electric motor is mounted in the casing 10, and current is supplied through the conduit 14.

A cleaning chamber 15 is carried at one end of the casing 10, and the chamber 15 is provided with an open upper end 16 preferably rectangular in shape. A driving shaft connection 17 extends from the motor within the casing 10 into the cleaning chamber 15, as is shown in Figures 2 and 3. A suitable dust collecting bag 18 communicates in any desired manner with the chamber 15 to collect dust therefrom, and a suitable exhaust fan may be provided for this purpose within the scope of the invention, as is set forth in my patent No. 2,323,908 issued July 13, 1943. A rectangular cleaning element 19, similar to that shown in my previous United States patent above identified, is mounted in the opening 16 in spaced relation relative to the side walls of the opening 16, as is shown in Figures 2 and 3, and is arranged to reciprocate therein. An eraser 20 is adapted to be held by the hand of an operator at the upper end of the opening 16 for bearing contact with the cleaning element 19. The cleaning element 19 is in the form of a grid similar to that shown in my patent above identified. The cleaning element 19 is connected by an integral cleaning element supporting arm 21 with a driving shaft 22 through the medium of a ball-bearing 23 riding upon an eccentric crank pin 24 similar to that shown in my previous patent above identified. As the driving shaft 22, which is driven from the shaft connection 17 of the motor rotates, the cleaning element supporting arm 21 will reciprocate rapidly and produce a beating action against the eraser 20 held in contact with the cleaning element 19. Ball-bearing assemblies 23 and 25 are carried by shaft 22, the bearing 25 being supported by the boss 26 carried by the wall of the chamber 15 as shown in Figure 3. A binding or lock nut 27 is threaded upon the outer end of the driving shaft 22. Access to the nut 27 is provided through the aperture 28 formed in the wall of the chamber 15 and boss 26 thereof. The driving shaft 22 is located in the chamber 15 inwardly relative to the open outer end 16.

A rocker arm 29 is connected to the cleaning element supporting arm by means of a journal pin 30 and rubber mounts 31 which may be laminated, as shown in Figure 3. These mounts, if desired, may be made of nylon or other resilient or shock absorbing material to prevent the journal pin 30 from breaking and to take up the jar during operation. Contact bosses 32 are carried by the side walls of the chamber 15 and engage the rocker arm 29 to prevent lateral play of the rocker arm 21. The resilient mounts 31 encase the journal pin 30 within the cleaning element supporting arm 21 and the pin 30 may be inserted in position upon the arm 21 through the aperture 33 formed in one of the bosses 32, while assembling the parts. When resilient mounts 31 become worn, replacement thereof is facilitated by removal of journal pin 30 through aperture 33. The outer end of the rocker arm 29 is anchored to the side walls of the chamber 15 by means of a shaft 34 which extends in parallel alignment with the pin 30 and shaft 22, to hold the cleaning element supporting arm 21 in a substantially vertical position. This rocker arm 29 will brace above the eccentric crank pin 24 and hold the arm 21 against any appreciable forward and backward movement while the bosses 32 will hold the arm 21 against the lateral swing.

While the preferred embodiment of this invention has been shown and described, it is nevertheless to be understood that various changes may be made therein within the scope of the appended claims.

Having described the invention, what I claim as new is:

1. An eraser cleaner of the class described comprising a casing having an eraser cleaning chamber formed therein, said casing having an eraser receiving opening in the upper end thereof, said opening communicating with said cleaning chamber, an eraser cleaning element mounted within said opening and inset within said casing, a supporting arm engaging said cleaning element and extending inwardly of said cleaning chamber, means connected to the lower end of said supporting arm to impart a beating action to said cleaning element through said supporting arm, a journal pin for said supporting arm located above said last mentioned means, laminated resilient mounts encasing said journal pin within said supporting arm and extending laterally of said supporting arm, a rocker arm pivoted to said casing within said cleaning chamber and engaging said laminated resilient mounts in lateral spaced relation to said supporting arm, and bosses carried by said casing and frictionally engaging said rocker arm to laterally brace said rocker arm, said journal pin having end portions protruding beyond said laminated resilient mounts and fitting in said rocker arm but not in connecting engagement with said bosses.

2. An eraser cleaner as defined in claim 1, wherein one of said bosses is provided with an aperture through which said journal pin is adapted to be extended during assembly to hold the laminated resilient mounts in position relative to said supporting arm and said rocker arm.

References Cited in the file of this patent

UNITED STATES PATENTS

| | | |
|---|---|---|
| 1,769,796 | Lepage | July 1, 1930 |
| 1,999,696 | Kitto | Apr. 30, 1935 |
| 2,163,788 | Hennefer | June 27, 1939 |
| 2,258,420 | Piron | Oct. 7, 1941 |
| 2,323,908 | Hennefer | July 13, 1943 |
| 2,776,175 | Waite | Jan. 1, 1957 |